United States Patent
Thrift et al.

(10) Patent No.: US 7,276,659 B2
(45) Date of Patent: Oct. 2, 2007

(54) ENCLOSURE HAVING A CLOSURE MEMBER

(75) Inventors: Timothy J. Thrift, Maple Grove, MN (US); Todd J. Mickley, Andover, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 0 days.

(21) Appl. No.: 11/141,267

(22) Filed: May 31, 2005

(65) Prior Publication Data

US 2006/0254795 A1    Nov. 16, 2006

(51) Int. Cl.
*H02G 3/08* (2006.01)

(52) U.S. Cl. .................. 174/50; 174/480; 174/481; 174/53; 220/3.2; 220/3.3

(58) Field of Classification Search ........... 174/50, 174/53, 57, 58, 48, 49, 480, 481, 500, 153 G, 174/152 G, 520, 559; 220/3.2, 3.3, 3.5, 3.8, 220/3.9, 4.02; 312/324, 248, 223.1, 294, 312/293.1, 249.1; 361/600, 601, 724, 725, 361/726, 727; 385/134, 135

See application file for complete search history.

(56) References Cited

U.S. PATENT DOCUMENTS

| | | | | |
|---|---|---|---|---|
| 5,066,832 A | * | 11/1991 | Clarey et al. ............. | 174/50 |
| 5,147,979 A | * | 9/1992 | Yang ...................... | 174/48 |
| 5,254,808 A | * | 10/1993 | Rodrigues et al. ......... | 248/56 |
| 5,568,362 A | * | 10/1996 | Hansson ................... | 174/50 |
| 5,708,751 A | * | 1/1998 | Mattei ..................... | 385/135 |
| 5,823,646 A | * | 10/1998 | Arizpe et al. ............. | 312/324 |
| 6,005,188 A | * | 12/1999 | Teichler et al. ........... | 174/50 |
| 6,069,315 A | * | 5/2000 | Tang ....................... | 174/50 |
| 6,265,670 B1 | * | 7/2001 | Duesterhoeft et al. ..... | 174/152 G |
| 6,291,767 B1 | * | 9/2001 | Beecher et al. ........... | 174/50 |
| 6,348,655 B1 | * | 2/2002 | Wright .................... | 174/50 |
| 6,460,951 B1 | * | 10/2002 | Baxter et al. ............. | 174/50 |
| 6,467,640 B1 | * | 10/2002 | Hung ...................... | 174/50 |
| 6,591,053 B2 | * | 7/2003 | Fritz ...................... | 385/135 |
| 6,755,493 B1 | * | 6/2004 | Krietzman et al. ........ | 312/248 |
| 6,791,841 B1 | * | 9/2004 | Tirrell et al. ............. | 361/724 |
| 6,831,222 B2 | * | 12/2004 | Pastuch ................... | 174/58 |
| 6,940,012 B2 | * | 9/2005 | Case ....................... | 174/50 |
| 2005/0179348 A1 | * | 8/2005 | Caveney et al. | |

OTHER PUBLICATIONS

"DataCom Double-Hinged Wall-Mount Cabinet", http://www.hoffmanonline.com/PDFCatalog/SpecifiersGuide/Ch3p82_83.pdf, Hoffman Enclosures Inc. Product Information,(2003),1 pg. (3.82).
"Proline® External Components—Tops and Bases", *Section 1.52 Gland Plates, Chapter 1: Modular Enclosure Systems, Hoffman Specifier's Guide*, http://www/hoffmanonline.com/PDFCatalog/SpecifiersGuide/01ModularEnclosureSystems.htm), Hoffman Enclosures Inc. Product Information,(2003),1 pg. (1.52).

* cited by examiner

*Primary Examiner*—Angel R. Estrada
(74) *Attorney, Agent, or Firm*—Schwegman, Lundberg & Woessner, P.A.

(57) ABSTRACT

An enclosure includes an enclosure body section having a first side which is at least partially open. The enclosure body section includes a second side adjacent to the first side, the second side having a cut-out extending to and open along the at partially open area of the first side and defining a cable entry section of the enclosure. A closure member is mountable to the enclosure body section to at least partially cover the cable entry section.

17 Claims, 5 Drawing Sheets

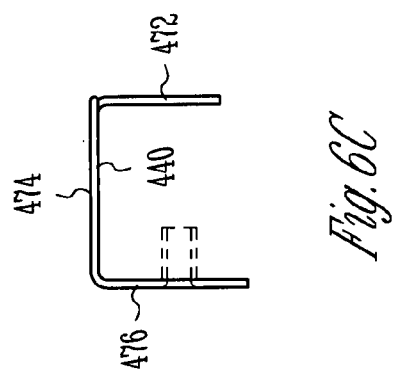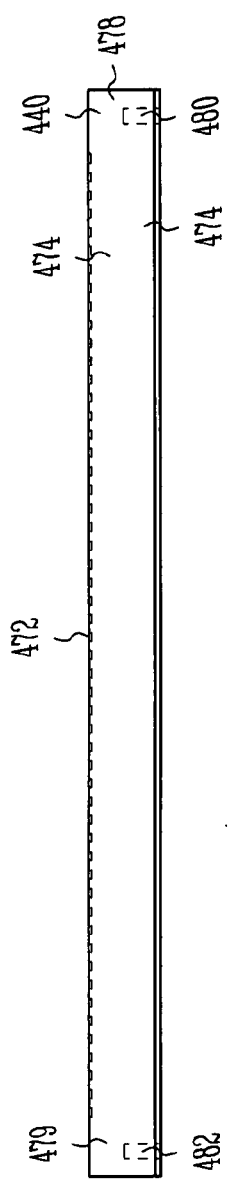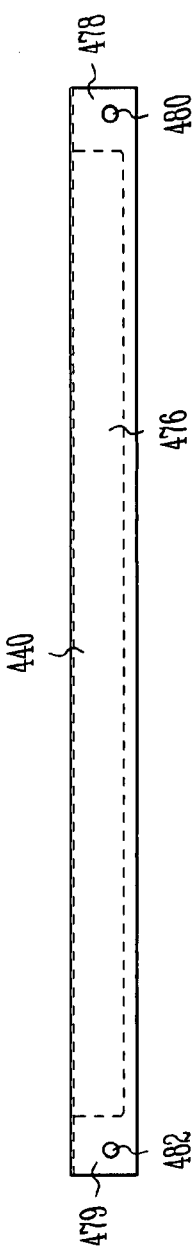

ENCLOSURE HAVING A CLOSURE MEMBER

FIELD OF THE INVENTION

This invention relates to the field of electrical enclosures, and more specifically to an enclosure having a closure member.

BACKGROUND

Electrical enclosures can be used to house assorted electrical equipment. The enclosure protects the electrical equipment from the environment and helps prevent access to the equipment. Typically, enclosures include knockouts located on the walls of the enclosure for cable entry. Some enclosures use a gland plate, which is a removable section of the enclosure. The gland plate can be removed to allow the feeding in of cables. There is a need for better cable management techniques for enclosures.

SUMMARY

An enclosure includes an enclosure body section having a first side which is at least partially open. The enclosure body section includes a second side adjacent to the first side, the second side having a cut-out extending to and open along the at partially open area of the first side and defining a cable entry section of the enclosure. A closure member is mountable to the enclosure body section to at least partially cover the cable entry section.

BRIEF DESCRIPTION OF THE DRAWINGS

FIG. 6A shows a top view of a closure member according to one embodiment.

FIG. 6B shows a front view of the closure member of FIG. 6A.

FIG. 6C shows a side view of the closure member of FIG. 6C.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
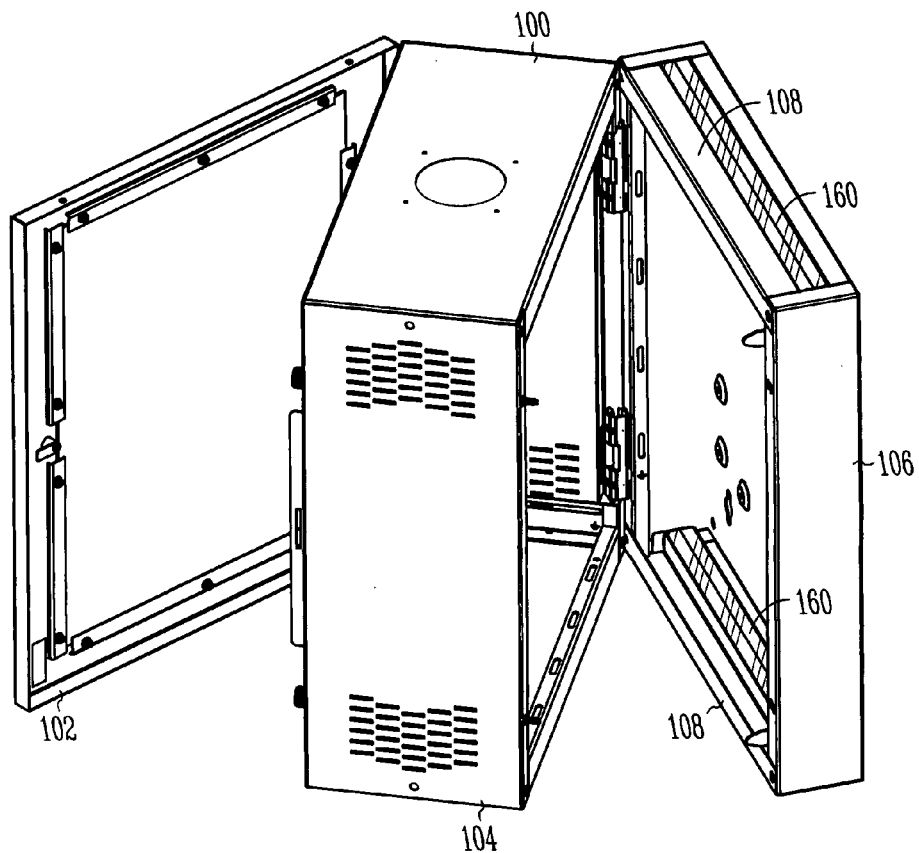
FIG. 1 shows a perspective view of an enclosure according to one embodiment.

FIG. 1 shows a perspective view of an enclosure 100 according to one embodiment. Enclosure 100 includes a body having a front door 102, a middle section 104 and a back body section 106. Enclosure 100 can be used to house datacom equipment or other electrical equipment and devices. Front door is mounted via hinges to middle section 104, and back section 106 is mounted to middle section 104 using hinges. Back section 106 is mountable to a wall, for example.

Back section 106 includes one or more gland plates or closure members 108. In this example, both the top and bottom of back section 106 include closure members 108. In other embodiments, only one closure member is provided on either the top or the bottom. In some embodiments, a closure member can be utilized on either side of the enclosure.

Figure 2:
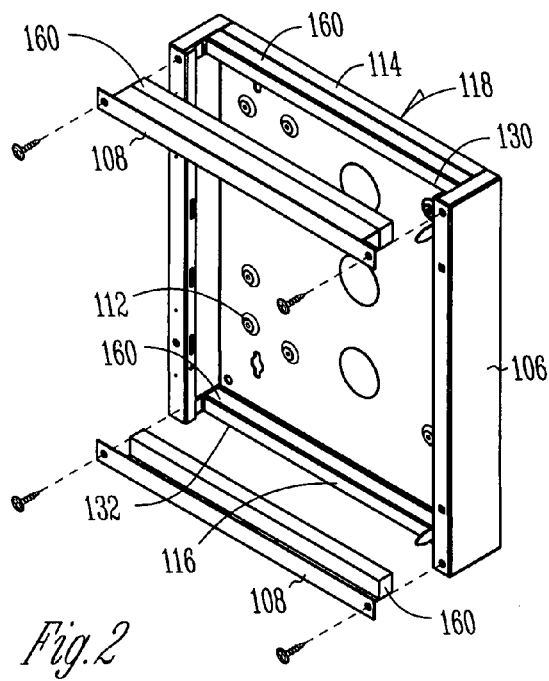
FIG. 2 shows a perspective view of a back body section of the enclosure of FIG. 1.

Referring now also to FIG. 2, which shows a perspective exploded view of back section 106, back section 106 includes a first, front side 112 that is at least partially open so as to be exposed to the opening of middle section 104, and a second, top side 114, adjacent to first side 112, having a cut-out 130 extending to and open along the opening of first side 112. Cut-out 130 communicates with the opening of first side 112 so as to define a lay-in cable entry section of the enclosure. Cut-out 130 can include a variety of different shapes, as will be discussed further below. In this example, a third, bottom side 116, adjacent to first side 112, includes a cut-out 132 which is also extending to and open along first side 112, defining a lay-in cable entry section.

Closure members 108 are mountable to the back section 106 to at least partially cover the lay-in cable entry sections defined by cut-outs 130, 132. For example, closure members 108 can be removed from back section 106 and cables can be layed-in over the back section so that the cables are within the cut-out areas 130, 132. The closure members 130 are then put back in place over the cable entry section to hold the cables in place and the closure members are fastened to back body section 106. This allows cables to be laid in place within the enclosure instead of having to feed them though a knock-out hole or gland plate hole of the enclosure.

In some embodiments, the back side 118 of back section 106 is the open side of the enclosure body, and cut-outs 130, 132 are open to the back side 118. In other examples, cut-outs 130, 132 can be located on other sides of the enclosure such as on left side or right side. Accordingly, cables can be laid into the enclosure from different orientations.

In one embodiment, a gasket material 160 is located on or around at least a portion of cut-outs 130, 132 and on a portion of closure members 108 such that the gasket material will squeeze around cables laid into the enclosure so as to provide a seal. Gasket material 160 can include a gasket material that compresses when the closure member is mounted to the enclosure body. In various embodiments, the gasket material can include a compliant material or a foam material, for example.

Figure 3:
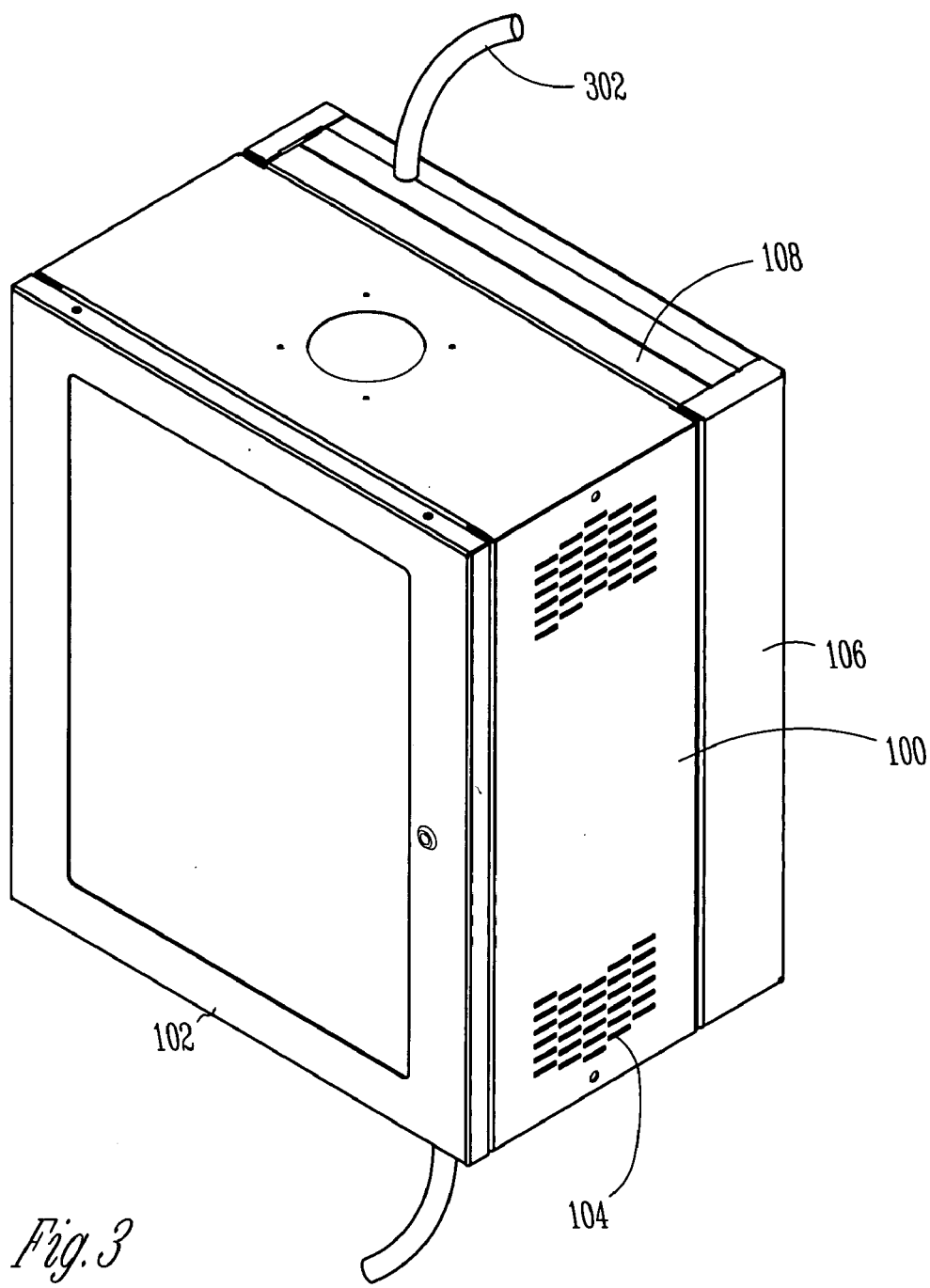
FIG. 3 shows a perspective view of the enclosure of FIG. 1.

Referring also now to FIG. 3, a cable 302 can be laid into the enclosure and closure members are then fastened to back section 106. Middle section 104 and front door 102 are closed and the cable is easily mounted for routing into and/or out of the enclosure. Cables 302 can be datacom fiber optic cables, for example. In other uses, the cable can include pneumatic lines or copper lines.

Figures 4, 5:
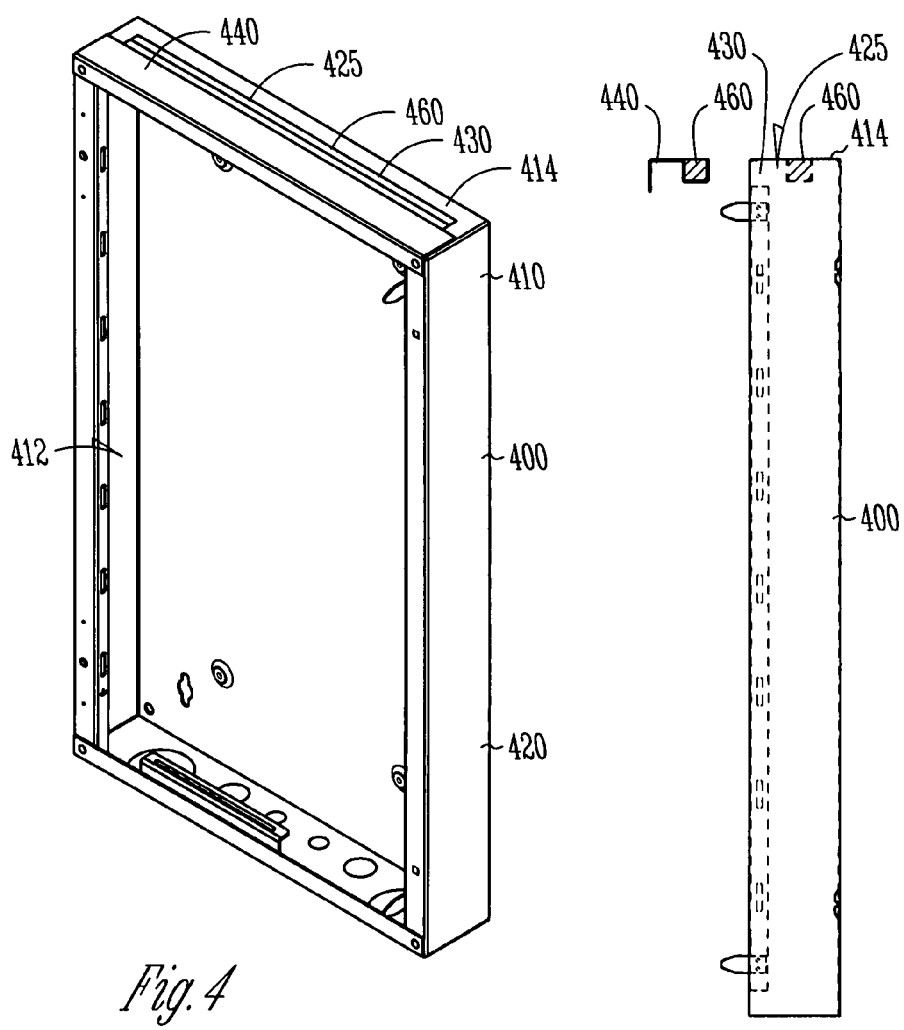
FIG. 4 shows a perspective view of a back body section of an enclosure, in accordance with one embodiment.
FIG. 5 shows a side view of the back body section of FIG. 4.

FIG. 4 shows a back body section 400 for a floor mount enclosure, in accordance with one embodiment. In use, the enclosure of FIG. 4 can include a middle section and front door similar to enclosure 100 described above, but dimensioned to fit back body section 406. FIG. 5 is a side cross-section view of back section 400 with a closure member 440 shown removed.

Back section 400 includes a first, front side 412 that is at least partially open and a second side 414, adjacent to first side 412, having a cut-out 430 extending to and open along the first side 412. Cut-out 430 communicates with the opening of front side 412 to define a lay-in cable entry section 425 of the enclosure. Cut-out 430 can include a variety of different shapes, as will be discussed further below.

Closure member 440 is mountable to the back section 400 to at least partially cover the lay-in cable entry section defined by cut-out 430 and the front opening. For example, closure member 440 can be removed from back section 406 and cables can be layed-in over the back section so that the cables are within the cut-out area 430. The closure member 440 is then put back in place over the cable entry section and fastened to hold the cables in place. Again, this allows cables to be laid in place instead of having to feed them though a knock-out hole.

In some embodiments, the back side of back section 406 can be the open side of the enclosure body, and cut-outs are open to the back side. In other examples, cut-outs can be located on other sides of the enclosure such as on left side or right side.

In one embodiment, a gasket material 460 is located on or around at least a portion of cut-out 430 and on a portion of closure members 440 such that the gasket material will squeeze around cables put into the enclosure and provide a seal. Gasket material 460 can include a gasket material that compresses when the closure member is mounted to the enclosure body. In various embodiments, the gasket material can include a compliant material or a foam material, for example.

FIGS. 6A, 6B, and 6C show top, front, and side views, respectively, of closure member 440, in accordance with one embodiment. Closure member 440 includes a front surface 476 dimensioned to extend along a front side of an enclosure. A top surface 474 extends perpendicular to front surface 476. A back surface 472 extends from the top surface. In this example, back surface 472 is not as long as top surface 474 leaving overhanging sections 478, and 479. This allows back surface 472 to fit within the profile of the inner area of an enclosure while the front surface 476 is fastened to the edges of the enclosure using mounting holes 480, 482, for example. In use, a gasket can be placed along the entire surface of surface 472.

Figure 7:
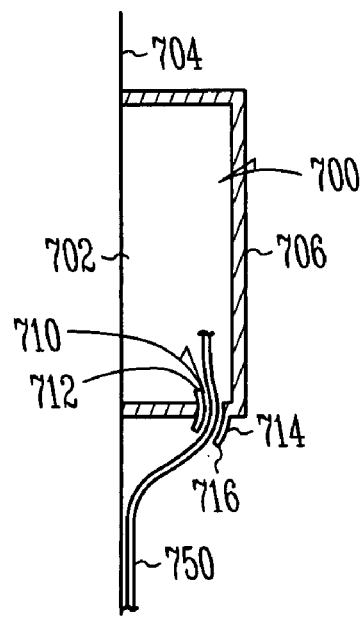
FIG. 7 shows a side view of an enclosure according to one embodiment.

FIG. 7 schematically shows a cross-section side view of an enclosure 700, according to one embodiment. Enclosure 700 includes a back enclosure body section 702 mounted to a wall 704 and a front door 706 mounted to the back body section. In this example, a cut-out 710 in the back body section includes a curved surface 712. A closure member 714 includes a corresponding curved surface 716. The cut-out surface 712 and the closure member 714 can be incorporated into the enclosures 100 or 400 discussed above, for example. The curved surfaces 712 and 714 can define a 3" radius, for example. This is an optimal curve for laying an optical cable 750 into or out of an enclosure. Other examples can use other radii.

Figure 8:
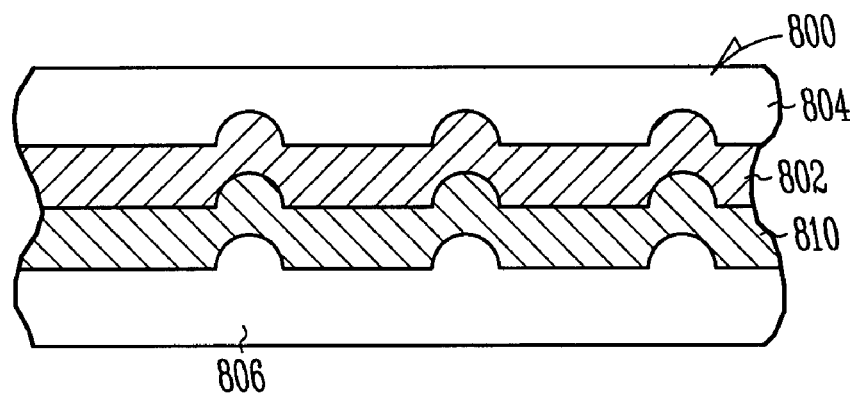
FIG. 8 shows a top view of a portion of an enclosure, in accordance with one embodiment.

FIG. 8 shows a top view of a portion of an enclosure 800 according to one embodiment. In this example, a cut-out side 802 of the enclosure body section includes a scalloped shape and the closure member 806 includes a corresponding scalloped shape. The shape of this example can be incorporated in any of the enclosures discussed above. A gasket material 810 can be used on each surface. In other embodiments, other shapes can be provided to optimize cable positioning and management.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An enclosure comprising:
an enclosure back body section having a back side to be mounted to a wall, and a front side which is at least partially open, the enclosure back body section having a second side adjacent to the front side, the second side having a cut-out extending to and open along the partially open area of the front side and defining a lay-in cable entry section of the enclosure, the cut-out not open to the back side, the second side including a surface facing the front side and including a gasket on the surface;
a middle enclosure section hinged to the enclosure back body section; and
a closure member removably mountable to the enclosure back body section to at least partially cover the cable entry section, wherein the closure member includes a first surface having a gasket mounted along the first surface and facing the gasket of the back body section and a second surface extending from the first surface and dimensioned to cover the cut-out, wherein the closure member and the enclosure back body section are configured such that a cable positioned in the lay-in cable entry section is sandwiched between the closure member and the enclosure back body section.

2. The enclosure of claim 1, wherein the lay-in cable entry section is configured such that cables can be laid in place with the lay-in cable entry section after the enclosure is mounted to a wall.

3. The enclosure of claim 2, wherein the cut-out is in a top side of the enclosure back body section.

4. The enclosure of claim 2, wherein the cut-out is in a bottom side of the enclosure back body section.

5. The enclosure of claim 1, wherein the second surface is perpendicular to the first surface.

6. The enclosure of claim 1, wherein the closure member includes a third surface extending from the second surface and including mounting holes to mount the closure member to the back body section.

7. The enclosure of claim 1, wherein the enclosure further includes a door hinged to the middle section, and wherein the enclosure back body section includes a third side adjacent to the front side, the third side having a second cut-out extending to and open along the partially open area of the front side and defining a second lay-in cable entry section of the enclosure, the second cut-out not open to the back side, and the enclosure includes a second closure member removably mountable to the enclosure back body section to at least partially cover the second cable entry section.

8. The enclosure of claim 1, wherein the cut-out defines a scalloped shape.

9. The enclosure of claim 1, wherein the cut-out defines a curved shape.

10. An enclosure comprising:
an enclosure back body section having a back side to be mounted to a wall and a front side which is at least partially open, the enclosure back body section having a second side adjacent to the front side, the second side having a cut-out communicating with the at least partially open area of the front side to form a lay-in cable area, the second side including a surface facing the front side and including a gasket on the surface; and
a closure member mountable to the enclosure back body section and configured to engage a cable located within the lay-in cable area, wherein the closure member includes a first surface having a gasket mounted along the first surface and facing the gasket of the back body section and a second surface extending from the first surface and dimensioned to cover the cut-out, wherein the closure member and the enclosure back body section are configured such that a cable positioned in the lay-in cable entry section is sandwiched between the closure member and the enclosure back body section.

11. The enclosure of claim 10, wherein the cut-out is not open to the back side.

12. The enclosure of claim 11, wherein the cut-out is in the top side of the enclosure body section.

13. The enclosure of claim 10, wherein the cut-out defines a scalloped shape.

14. The enclosure of claim 10, wherein the cut-out defines a curved shape.

15. The enclosure of claim 10, wherein the second surface is perpendicular to the first surface.

16. The enclosure of claim 10, wherein the closure member includes a third surface extending from the second surface and including mounting holes to mount the closure member to the back body section.

17. A method comprising:
providing an enclosure including an enclosure back body section having a back side to be mounted to a wall and a front side which is at least partially open, the enclosure back body section having a second side adjacent to the front side, the second side having a cut-out communicating with the at least partially open area of the front side to form a lay-in cable area, the second side including a surface facing the front side and including a gasket on the surface;
laying in a cable over the lay-in cable area;
fastening a removable closure member to the enclosure body section over the cable, wherein the closure member includes a first surface having a gasket mounted along the first surface and facing the gasket of the back body section and a second surface extending from the first surface and dimensioned to cover the cut-out; and
closing a middle enclosure section over the back body section such that the closure member is between the middle enclosure section and the back body section.

* * * * *